United States Patent [19]

Sze

[11] Patent Number: 4,601,039

[45] Date of Patent: Jul. 15, 1986

[54] INDUCTIVELY STABILIZED, LONG PULSE DURATION TRANSVERSE DISCHARGE APPARATUS

[75] Inventor: Robert C. Sze, Santa Fe, N. Mex.

[73] Assignee: The Regents of the University of California, Berkeley, Calif.

[21] Appl. No.: 528,509

[22] Filed: Sep. 1, 1983

[51] Int. Cl.[4] ............................................. H01S 3/097
[52] U.S. Cl. ...................................... 372/83; 372/38; 372/57; 372/86; 372/87
[58] Field of Search ................. 372/83, 86, 87, 57, 372/38; 315/324, 334, 335

[56] References Cited

U.S. PATENT DOCUMENTS

| | | | |
|---|---|---|---|
| 3,408,593 | 10/1968 | Hurwitz | 372/87 |
| 3,842,366 | 10/1974 | Gordon et al. | 372/86 |
| 3,876,958 | 4/1975 | Parker | 372/87 |
| 4,143,337 | 3/1979 | Beaulieu | 372/38 |
| 4,426,706 | 1/1984 | Liu et al. | 372/86 |

*Primary Examiner*—James W. Davie
*Attorney, Agent, or Firm*—Samuel M. Freund; Valentin Fikovsky

[57] ABSTRACT

An inductively stabilized, long pulse duration transverse discharge apparatus. The use of a segmented electrode where each segment is attached to an inductive element permits high energy, high efficiency, long-pulsed laser outputs to be obtained. The present apparatus has been demonstrated with rare-gas halide lasing media. Orders of magnitude increase in pulse repetition frequency are obtained in lasing devices that do not utilize gas flow.

11 Claims, 7 Drawing Figures

INDUCTIVELY STABILIZED, LONG PULSE DURATION TRANSVERSE DISCHARGE APPARATUS

BACKGROUND OF THE INVENTION

The present invention relates generally to the production of stable electric avalanche discharges and more particularly to an inductively stabilized, long pulse duration transverse discharge apparatus. This invention is the result of a contract with the Department of Energy (Contract No. W-7405-ENG-36).

High pressure, transverse discharges are inherently unstable. In rare-gas halide gas mixtures the degree of stability as measured by the energy loading and stable discharge time depends on the gaseous components of a particular laser medium. As one increases the energy deposition in the gaseous medium, streamer arcs are observed throughout the discharge. This results in a limited lasing time since the useful energy deposition time is limited by the time it takes for the streamer arcs to propagate across the electrode spacing. Studies of the details of streamer arc formation have shown that stringent requirements exist for the preionization electron density and uniformity as well as for the voltage rise time in order to insure sustained stable discharge operation. See, e.g., S. Lin and J. J. Levatter, Appl. Phys. Lett. 34, 505 (1979), and J. J. Levatter and S. Lin, J. Appl. Phys. 51, 210 (1980). The inherent drawback of systems built incorporating these results is a need for a very fast voltage rise time which necessitates the development of a very low inductance switch or some pulse sharpening scheme which precludes the use of conventional thyratron switches. A solution to this problem is the passive stabilization of the electrodes, and specifically, inductively stabilized electrodes.

Resistive stabilization of high pressure gas discharges is known in the art. Inductively stabilized discharges are a substantial improvement over resistively stabilized discharges since there are no ohmic losses which cause electrode heating (in addition to that from the cathode fall) and ultimately limit pulse repetition rate, and since there is no energy loss which limits energy deposition to the discharge.

Resistive stabilization of transverse discharges has been applied to several rare-gas halide lasing systems in order to circumvent the problems in scaling such lasers. The effect of resistive ballasting on the discharge stability of a uv-preionized discharge-excited, XeCl* laser is described in "Resistive Stabilization of a Discharge-Excited XeCl* Laser," by D. C. Hogan, A. J. Kearsley, and C. E. Webb, J. Phys. D: Appl. Phys. 13, L225 (1980). The authors suggest therein that distributive resistive ballasting of the transverse discharge electrodes must be provided so that if a localized region of high current density were to develop, the voltage in that region of electrode would decrease and further growth of the incipient arc would be suppressed. Arc-free discharges are reported by the authors to be maintained for relatively long time periods thereby allowing relatively long output pulses to be obtained. No mention, however, is made of alternative measures to distributed resistive ballasting of a single electrode. As mentioned hereinabove, resistively stabilized discharges result in ohmic losses which cause electrode heating which ultimately limits the pulse repetition rate. The subject invention substantially eliminates this limitation.

SUMMARY OF THE INVENTION

An object of the instant invention is to provide an apparatus for producing stable transverse discharges in high pressure gaseous media.

Another object of the subject invention is to provide an apparatus for producing stable discharge rare-gas halide laser action.

Yet another object for my invention is to provide an apparatus for producing long-pulsed operation stable discharge rare-gas halide laser action.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus of this invention may include a segmented planar first electrode, each segment having one terminal of an inductive element attached for the purpose of limiting the rate at which an electric current can pass through the individual segments, a second terminal of each inductive element being tied together forming a common bus, a second planar electrode parallel to and spaced apart from the first electrode and being approximately coextensive therewith, a gas impermeable enclosure surrounding the first and second electrodes, means for establishing a potential difference between the bus and the second electrode suitable for producing a first, controlled puled electric avalanche discharge in the volume formed by the two electrodes, and means for initiating the electric discharge. Preferably, the electric discharge initiating means includes a third, substantially planar electrode spaced apart from and parallel to the second electrode on the side of the second electrode away from the first electrode. Means are provided for causing a second, pulsed electric discharge in the volume formed between the second and third electrode. Preferably, also, the second electrode allows ultraviolet light generated by the second electric discharge to enter the volume formed by the first and second electrode thereby preionizing the gaseous medium located in this first volume and uniformly initiating the first pulsed electric avalanche discharge in that region. It is preferred that the third electrode includes an electrical conductor insulated by a nonconducting medium which limits the current flow in the second pulsed electric discharge between the third electrode and the second electrode to essentially displacement current.

The apparatus of the present invention then provides a system for depositing high energy per unit time into a gaseous medium over long time periods. The long lasing pulses resulting therefrom lead to much improved beam quality. The ability to deposit energy in a discharge over long time periods eliminates the need for a fast voltage rise time thereby allowing the use of conventional thyratron switches. Moreover, inductively stabilized discharges do not have the ohmic losses which occur when the discharge is stabilized by resistive loading and which results in electrode heating and the ultimate limitation of the pulse repetition rate. There is, further, no energy mechanism which limits energy deposition to the discharge. These principles have been applied to the development of an inductively stabilized rare-gas halide miniature laser.

BRIEF DESCRIPTION OF THE DRAWINGS

The accompanying drawings, which are incorporated in and form a part of the specification, illustrate two embodiments of the present invention and, together with the description, serve to explain the principles of the invention. In the drawings.

DETAILED DESCRIPTION OF THE INVENTION

Figure 1A:
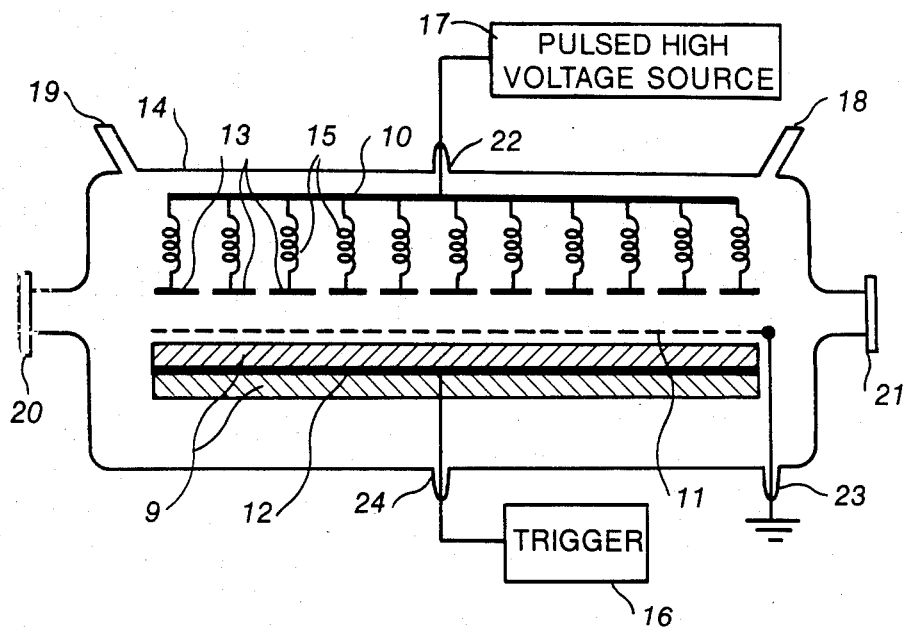
FIGS. 1a and 1b are schematic representations of two embodiments of the inductively stabilized discharge apparatus of the subject invention showing a segment elongated cathode wherein each segment is driven by an inductive element, and a solid elongated cathode having inductive elements spaced apart along its longest dimension, respectively.

Reference will now be made in detail to the present preferred embodiment of the invention, an example of which is illustrated in the accompanying drawings. Turning now to FIG. 1a, a segmented cathode 13 was constructed such that each segment is associated with an inductor 15, and all of the inductors are tied to a common bus 10 which is attached to a pulsed high voltage source 17. Parallel to and spaced apart from the cathode is a wire screen anode 11 which is held at ground potential. A third, composite electrode is spaced apart from and parallel to the wire screen electrode on the other side thereof from the segmented cathode. An electrically conducting element 12 is surrounded by an insulating material 9 which electrically isolates it from a direct discharge to the wire screen anode 11. Preferably, this insulating material is a quartz tube. The conducting element is attached to a trigger device 16 which provides a low energy, high voltage pulse to it timed to fire before the pulsed source 17 is fired. The three electrodes are surrounded by a gas impermeable envelope 14 which is provided with inlet and outlet ports 18, 19 for the purpose of filling and removing the gaseous lasing medium from the enclosure. The ports 18, 19 are designed to permit a static fill operation of the discharge apparatus. Windows 20, 21 are fitted with highly transmitting material when the apparatus is used as a laser. In a preferred embodiment of my invention, 87 separate segments with 0.79 mm separation between adjacent segments comprise a 27.6 cm total discharge length having a 20.8 cm active discharge length. The anode-to-cathode electrode separation is about 2.5 mm and the discharge width is approximately 4 mm. The configuration shown in FIG. 1a has also been constructed using 87, 4.7 $\Omega$, $\frac{1}{4}$ W carbon resistors in parallel giving a net resistance in series with the discharge of 54 m$\Omega$. The 4.7 $\Omega$ array was the lowest value used for comparison experiments using resistors since the discharge operation shows it to be only marginally stable with arcs being observed in the discharge for a substantial number of gas mixtures and pressures. This result has been published in "Inductively Stabilized Rare-Gas Halide Mini-Laser for Long-Pulsed Operation," by Robert C. Sze, J. Appl. Phys 54, 1224 (1983). Previous experience in developing miniature excimer laser has shown that for an approximately 4 mm gap spacing, the stable discharge time for an unstabilized laser is only 10 ns. (See, e.g., R. C. Sze and E. Seegmiller, IEEE J. Quant. Elec. QE-17, 81 (1981)). Therefore, ultra fast pulsed charging circuits were required to deposit all of the usable energy within the stable discharge time. However, using the inductively stabilized discharge electrodes of the present invention, ultra fast circuits are no longer necessary. No arcing has been observed for most gas mixtures investigated in the research which formed the basis of the subject invention at electrode spacings up to 1 cm and for total energy deposition times greater than 200 ns. Prevention of arcs is accomplished by the nearest local controlling inductor in the following manner. As the discharge region begins to become unstable, there is a rapid increase in current. However, the increase in current causes a voltage drop across the inductor ($v = L di/dt$) which translates into a decrease in voltage across the gap. The drop in voltage across the gas immediately quenches the arc formation.

Figure 1B:
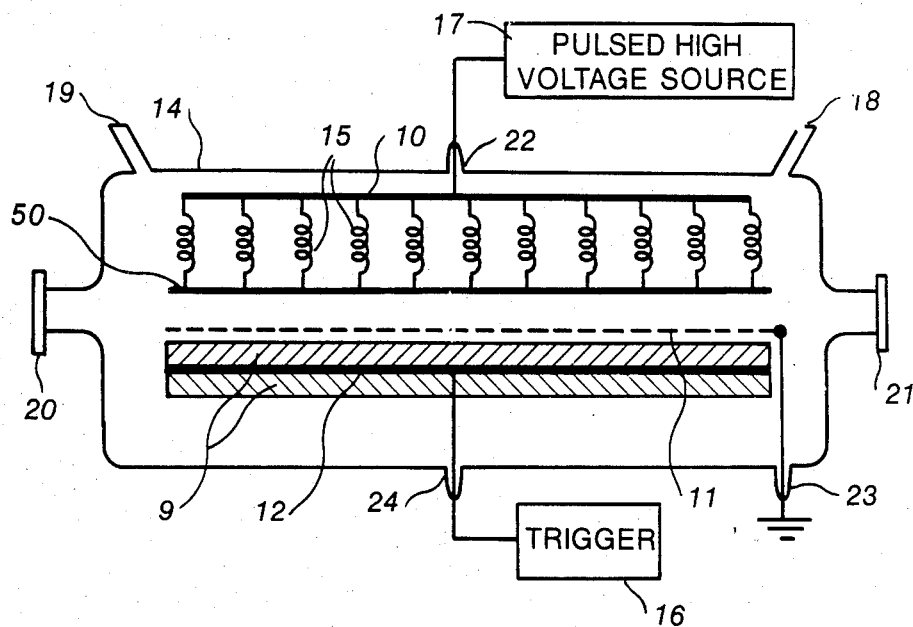

FIG. 1b shows a second embodiment of my invention identical in all respects to that shown in FIG. 1a except that the cathode 50 is a solid elongated electrode having inductive elements 15 spaced apart along its longest dimension. All of the inductors are tied to a common bus 10 which is attached to a pulsed high voltage source 17. It is anticipated, that arcs will be prevented in the same manner as described in the previous paragraph.

Figure 2:
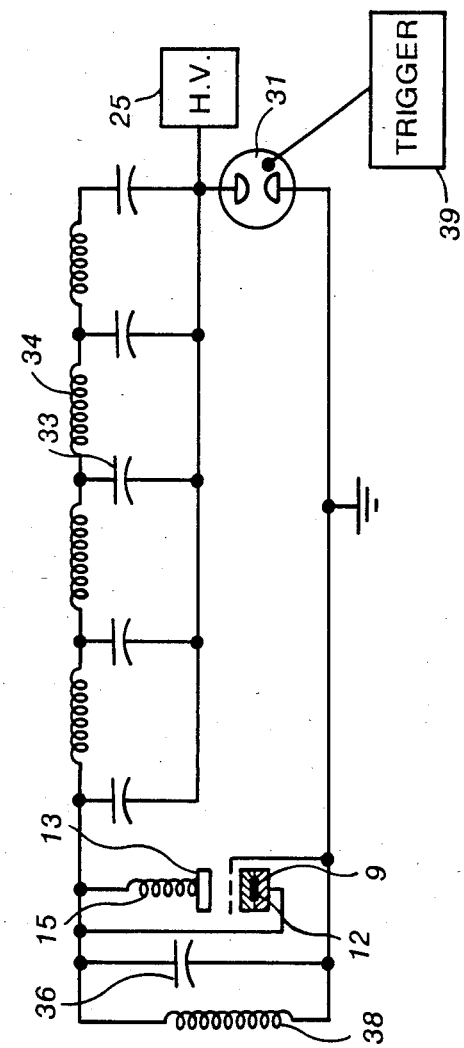
FIG. 2 is a schematic diagram of the electrical network used to operate the apparatus of the present invention as a laser.

FIG. 2 is a schematic representation of the electrical circuitry used to energize the apparatus of the present invention for its use as an excimer laser. Here the pulsed high voltage source includes a dc supply 25, and a thyratron 31 triggered by a pulse generator 39. The capacitor bank 33 is constructed of discrete components because ultra fast circuits are no longer necessary. The combination of capacitors 35 and inductors 34 are used to make a pulse forming network. The peaking capacitors 36 are necessary because the corona preionization exists only during the rise time of the voltage pulse before gas breakdown. A fast current rise time is required so that a uniform current distribution is established in the discharge volume before the preionization electrons disappear. The inductor value chosen for each of the 87 segmented cathode sections was 0.15 $\mu$H, giving a total inductance in series with the discharge of only 1.7 nH. This value is comparable to the electrode inductance resulting from its size and shape, and thereby does not effect the overall circuit parameters to any significant extent. The main discharge is fired by switching thyratron 31 with trigger 39.

Figure 3:
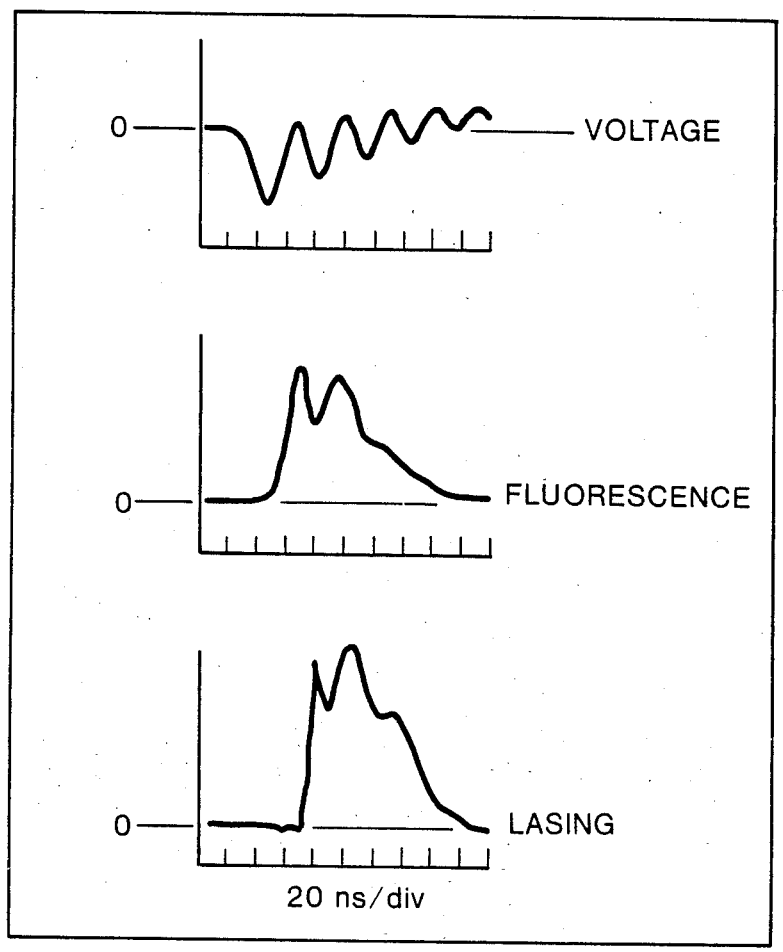
FIG. 3 shows the temporal development of the voltage, fluorescence, and laser output when the subject apparatus is used as a XeCl laser.

FIG. 3 shows the temporal development of the voltage, fluorescence, and laser output when the subject apparatus was used as a XeCl laser. The gas mixture was 0.13% $H_2$—HCl/0.2% Xe in helium buffer where the ratio of $H_2$:HCl=1.4 The filling pressure was 35 psia, and the output coupler was 75% R. The voltage was measured across both the discharge and the inductor array. The lasing gas mixture was poorly impedance matched to the impedance of the peaking capacitor 36 of FIGS. 1a and 1b and the laser head inductance which includes the inductor array 15 of FIGS. 1a and 1b, and the single-pass energy deposition time was only approximately 40 ns long. However, the lack of impedance matching caused multiple reflections and since the discharge remained stable, these reflections contributed to the energy deposition and resulted in total lasing times of greater than 120 ns. From the fluorescence and laser output temporal traces in FIG. 3 for this gas mixture and pressure, it is seen that as many as four voltage reflections contributed to the energy deposition. As an example of the use of the apparatus of the present invention, Table I shows the best efficiencies and energies measured for KrF, XeCl, and XeF lasers.

Parametric studies have shown the effect of discharge impedance on the total lasing time. Generally, high impedance of the discharges have short pulse lengths. This is because the higher the impedance discharge, the closer is the matching to the source impedance which allows more energy to be deposited into the gas in the first ring of the circuit. Therefore, less energy is available for subsequent rings of the discharge circuit which contribute to long pulse operation. Table II gives estimates of the arc-free energy deposition and energy extraction from the excimer mini-laser example of the present invention as compared with those obtained for a commonly used unstabilized discharge excimer laser. By use of the apparatus of the present invention, more than 300 J/liter-atmosphere of energy may be deposited in an arc-free discharge at 3 atm filling pressure as opposed to the 60–70 J/liter-atmosphere obtainable by unstabilized devices. Little benefits, however, is derived from energy deposition beyond the 100 J/liter-atmosphere level in the present time scale for energy deposition since rapid saturation of the output energy as well as the pulse width are observed.

It is known that residual ions and thermal instabilities limit the pulse repetition rate of a laser. In a small lasing device such as that used to demonstrate the apparatus of the present invention, the stabilized laser was operated at a pulse rate in excess of 70 Hz without gas flow, while similar unstabilized devices are generally limited to about 1 Hz. However, the present laser is generally operated at 10 Hz because of thermal distortions observed at higher pulse repetition rates. These distortions, which are pressure dependent, should be correctable with proper index correcting optics once the thermal index changes are measured at a particular pulse repetition rate.

Figure 4:
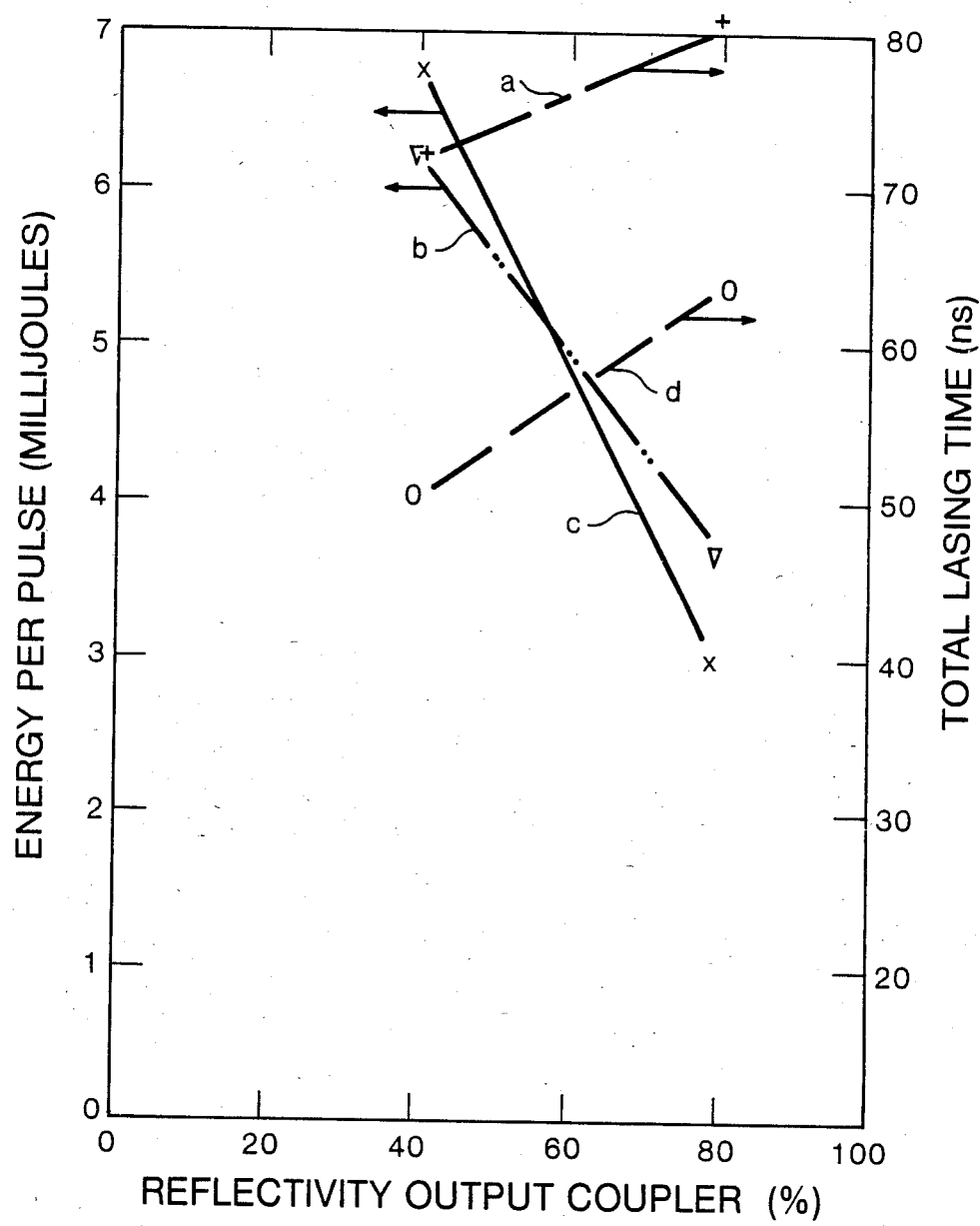
FIG. 4 shows the energy output per pulse and the total lasing time as a function of the percent reflectivity of the output coupler for the subject apparatus in its use as a KrF lasing system.

FIG. 4 shows the performance characteristics for KrF for two different gas mixtures having neon as a buffer gas at 45 psia filling pressure. The optimum gas fill depends on what value of the reflectivity is chosen for the output mirror. Curves a and b in FIG. 4 represent data taken with a 0.1% $F_2$/5% Kr mixture in neon buffer gas, while Curves c and d represent data taken with a 0.2% $F_2$/5% Kr mixture again with neon as a buffer gas. For long pulse operation, the 0.1% $F_2$ mixture is clearly better with the 80% R output coupler because the impedance matching is poorer, thereby giving rise to longer pulses. For the highest energy output, however, regardless of pulse length, the 0.2% $F_2$ mixture with 38% R output coupler is most effective. Arcing was observed for KrF laser mixtures with helium diluent and the resultant pulse length was substantially shorter.

Figure 5:
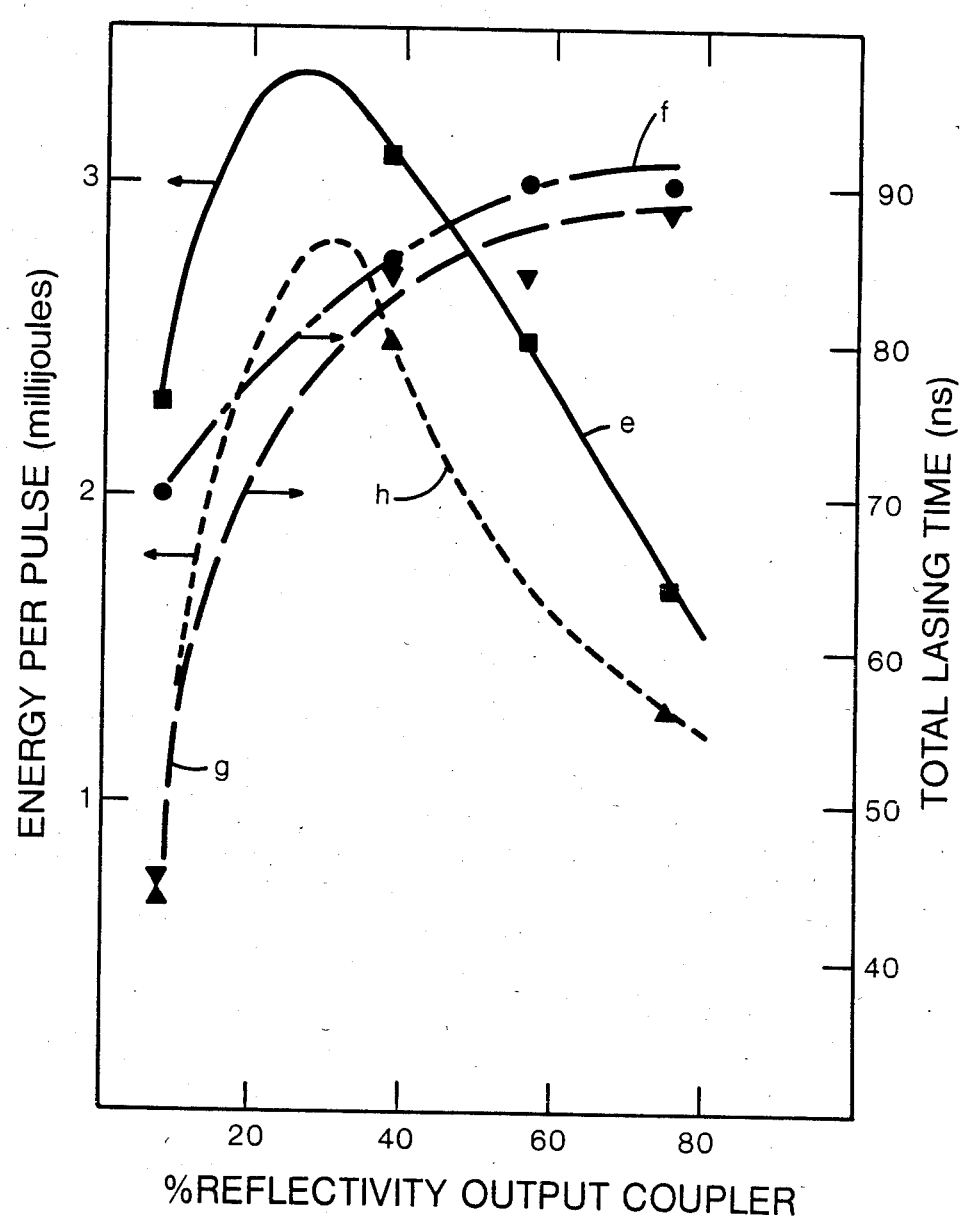
FIG. 5 shows the energy output per pulse and the total lasing time as a function of the percent reflectivity of the output coupler for the subject apparatus in its use as a XeCl lasing system.

FIG. 5 compares results of a XeCl lasing for neon and helium buffer gases as a function of output coupling. Curves e and f in FIG. 5 represent data taken for 0.15% $H_2$—HCl/0.5% Xe mixture in neon buffer gas, while Curves g and h represent data taken with a 0.2% $H_2$—HCl/0.2% Xe gas mixture with helium buffer gas. The filling pressure was 45 psia, and the ratio of hydrogen to hydrogen chloride was 1:4. The best performance obtained for KrF was 6.8 mJ per pulse with 40 ns full-width-at-half-maximum and a total lasing time of greater than 50 ns, and for long pulse operation, 3.7 mJ per pulse with 60 ns full-width-at-half-maximum and a total lasing time of greater than 80 ns. Further, the best performance obtained for XeCl was 3.1 mJ per pulse with a 40 ns full-width-at-half-maximum and a total lasing time of greater than 85 ns and 1.7 mJ per pulse with 60 ns full-width-at-half-maximum and a total lasing time of greater than 90 ns. The storage capacitors were made up of five banks of twelve 0.5 nF barium titanate 20 kV capacitors. At 16 kV charging voltage, the stored energy in the capacitors was 2.7 J using all five capacitor banks and 0.54 J using only one capacitor bank. Approximately 85% of the lasing energy was obtained with one bank in contrast to using all five capacitor banks. This gives an efficiency of approximately 1.07% for KrF including all losses. The 0.6% efficiency obtained for XeCl is a factor of about twenty more efficient than the resistively stabilized devices previously reported.

Figure 6:
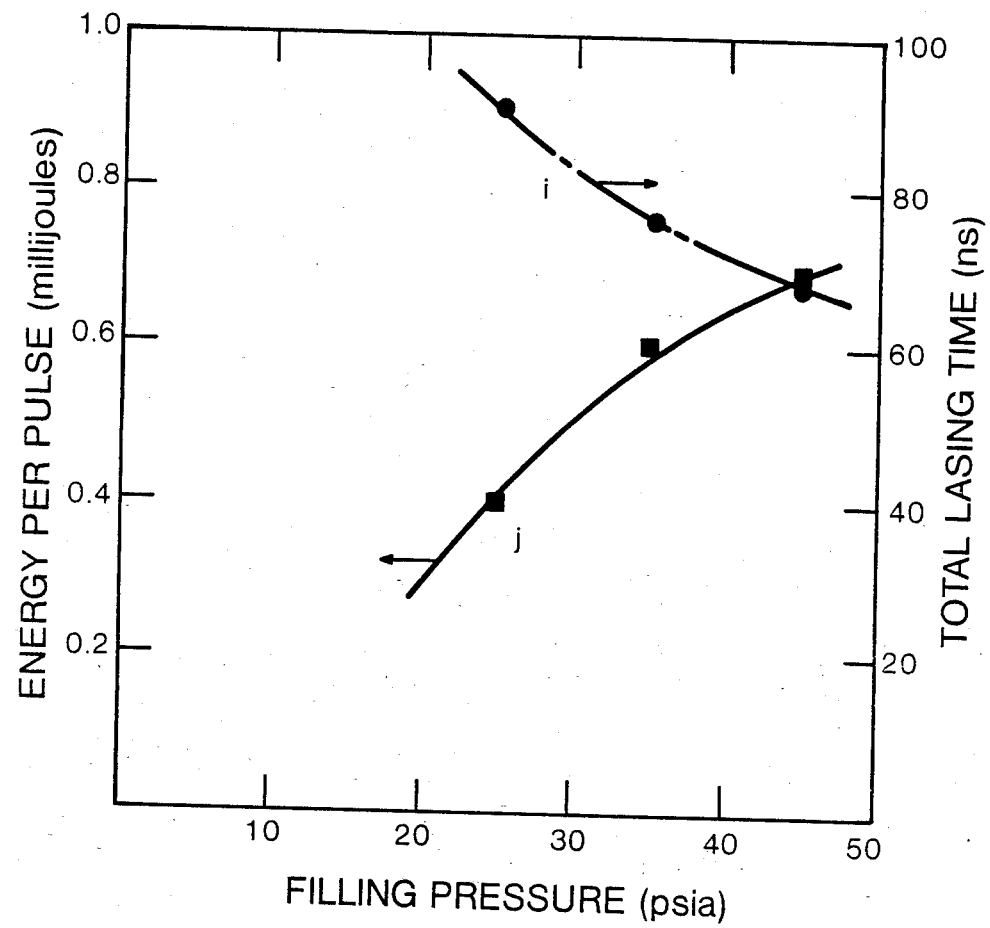
FIG. 6 shows the energy output per pulse and the total lasing time as a function of gas pressure for the subject apparatus in its use as a XeCl lasing system.

FIG. 6i shows the total lasing time, while FIG. 6j shows the laser output energy per pulse as a function of gas pressure for XeCl. A mixture of 0.13% $H_2$—HCl/1.9% Xe in neon buffer gas was used with a 75% R output coupler. To be noticed is the decrease in pulse length with increasing pressure which reflects the increase in gas discharge impedance as discussed hereinabove.

The foregoing description of the two preferred embodiments of the invention has been presented for purposes of illustration and description. It is not intended to be exhaustive or to limit the invention to the precise form disclosed, and obviously many modifications and variations are possible in light of the above teaching. For example, a solid elongated cathode could be employed with inductive elements spaced apart along its longest dimension. The second terminals of these inductive elements would be tied forming a common bus to which the high voltage would be applied. A similar

TABLE I

|  | Best Efficiency | Output Coupling | Energy | Lasing Time FWHM (ns) | Total (ns) |
|---|---|---|---|---|---|
| KrF | 1.07% | 40% R | 6.8 mJ | 40 | 50 |
|  |  | 80% R | 3.7 | 60 | 80 |
| XeCl | 0.57% | 55% | 3.1 | 40 | 85 |
|  |  | 75% | 1.7 | 80 | 90 |
| XeF | 0.36 | 48% R | 2.3 | 40 | 80 |
|  |  | 87% R | 2.0 | 62 | 120 |

TABLE II

|  | Inductively stabilized | Levatter-Lin type |
|---|---|---|
| Energy Deposition | 300 J/1 atm at 45 psia<br>385 J/1 atm at 35 psia | 60–70 J/1 atm at 30 psia |
| Energy Extraction | 1.2 J/1 atm in KrF<br>0.5 J/1 atm in XeCl | 1.4 J/1 atm in XeCl | limitation of current would occur which would reduce the tendency for arc formation from any area of the cathode. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for producing a stable transverse electric discharge in a rare-gas halide laser medium such that a population inversion suitable for lasing is caused to occur, said apparatus comprising in combination:
   a. first, substantially planar elongated electrode having a plurality of segments wherein each of said segments is individually associated with one terminal of an inductive element, a second terminal of each of said inductive elements being brought into electrical contact thereby forming a common bus, the combined electrical impedance of said plurality of inductive elements being significantly less than the electrical impedance of the laser medium involved in the electric discharge;
   b. a second substantially planar electrode spaced apart from said first electrode, said second electrode being disposed substantially parallel to said first electrode and being substantially coextensive therewith, said first electrode and said second electrode forming a first volume therebetween into which the laser medium can freely travel;
   c. means for establishing a potential difference between said common bus and said second electrode suitable for producing a first, controlled, pulse electric discharge in the laser medium in the first volume; and
   d. means for initiating the first electric discharge, whereby each of said inductive elements limits the rate of change of electric current passing through the electrode segment associated therewith, thereby significantly reducing the formation of arcs, whereby the combined inductance of said first electrode, said second electrode, said potential difference establishing means, said first electric discharge initiating means, and said plurality of inductive elements is sufficiently small that the first electric discharge takes place substantially within a time period of less than one microsecond, and whereby the quantity of electrical energy transferred to the laser medium is increased relative to that absorbed by said plurality of inductive elements.

2. The apparatus as described in claim 1, wherein a gas impermeable enclosure is provided, said enclosure surrounding said first electrode and said second electrode and having means for filling said enclosure with the gaseous medium and for evacuating the gaseous medium therefrom.

3. The apparatus as described in claim 2 wherein said electric discharge initiating means includes a third, substantially planar elongated electrode spaced apart from said second electrode, said third electrode being disposed substantially parallel to said second electrode being disposed substantially parallel to said second electrode on the side of said second electrode away from said first electrode there being formed a second volume between said second electrode and said third electrode into which the gaseous medium can freely flow, wherein means are provided for causing a second, pulsed electric discharge in said second volume in the gaseous medium located therein suitable for generating substantial hard ultraviolet light, and wherein said second electrode is permeable to said generated ultraviolet light permitting a portion of said generated ultraviolet light to enter said first volume thereby preionizing said the medium located in said first volume and uniformly initiating said first pulsed electric discharge therein.

4. The apparatus as described in claim 3 wherein said second electrode includes an electrically conducting wire screen, said wire screen being spaced apart from said first electrode, being disposed in a substantially parallel manner thereto, and being substantially coextensive therewith in such a manner that said portion of said generated ultraviolet light can pass freely from said second volume into said first volume.

5. The apparatus as described in claim 4, wherein said third electrode includes an electrical conductor insulated by a nonconducting medium which limits the current flowing in said second pulsed electric discharge between said third electrode and said second electrode to substantially displacement current.

6. The apparatus as described in claim 5, wherein said potential difference establishing means includes a peaking capacitor for increasing the rate at which current can be supplied to said first controlled pulsed electric discharge such that there remains sufficient preionization in said first volume from said second pulsed electric discharge that said first pulsed electric discharge can be uniformly initiated.

7. An apparatus for producing a stable transverse electric discharge in an unstable gaseous laser medium such that a population inversion suitable for lasing is caused to occur, said apparatus comprising in combination:
   a. a first, substantially planar elongated electrode having a plurality of segments wherein each of said segments is individually associated with one terminal of an inductive element, a second terminal of each of said inductive elements being brought into electrical contact thereby forming a common bus, the combined electrical impedance of said plurality of inductive elements being significantly less than the electrical impedance of the laser medium undergoing the electric discharge;
   b. a second substantially planar electrode spaced apart from said first electrode, said second electrode being disposed substantially parallel to said first electrode and being substantially coextensive therewith, said first electrode and said second electrode forming a first volume therebetween into which the laser medium can freely travel;
   c. means for establishing a potential difference between said common bus and said second electrode suitable for producing a first, controlled, pulsed electric discharge in the laser medium in the first volume; and
   d. means for initiating the first electric discharge, whereby each of said inductive elements limits the rate of change of electric current passing through the electrode segment associated therewith, thereby significantly reducing the formation of arcs, whereby the combined inductance of said first electrode, said second electrode, said potential difference establishing means, said first electric discharge initiating means, and said plurality of inductive elements is sufficiently small that the first electrc discharge takes place substantially within a time period of less than one microsecond, and whereby the quantity of electrical energy transferred to the laser medium is increased relative to that absorbed by said plurality of inductive elements.

8. The apparatus as described in claim 7, wherein a gas impermeable enclosure is provided said enclosure surrounding said first electrode and said second electrode and having means for filling said enclosure with the gaseous medium and for evacuating the gaseous medium therefrom.

9. The apparatus as described in claim 8, wherein means are provided for extracting laser energy from said gas impermeable enclosure.

10. An apparatus for producing a stable transverse electric discharge in a rare-gas halide laser medium such that a population inversion suitable for lasing is caused to occur, said apparatus comprising, in combination:
   a. a first, substantially planar elongated solid electrode having a first elongated side and a second elongated side and having a plurality of spaced-apart inductive elements, one terminal of each of said inductive elements being in electrical contact with said first elongated side, thereof, a second terminal of each of said inductive elements being brought into electrical contact thereby forming a common bus, the combined electrical impedance of said plurality of inductive elements being significantly less than the electrical impedance of the laser medium undergoing the electrical discharge;
   b. a second substantially planar electrode spaced apart from said first electrode and opposing said second side thereof, said second electrode being disposed substantially parallel to said first electrode and being substantially coextensive therewith, said first electrode and said second electrode forming a first volume therebetween into which the laser medium can freely travel;
   c. means for establishing a potential difference between said common bus and said second electrode suitable for producing a first, controlled, pulsed electric discharge in the laser medium in the first volume; and
   d. means for initiating the first electric discharge, whereby each of said inductive elements limits the rate of change of electric current passing through an area of said first electrode associated therewith, thereby significantly reducing the formation of arcs, whereby the combined inductance of said first electrode, said second electrode, said potential difference establishing means, said first electric discharge initiating means, and said plurality of inductive elements is sufficiently small that the first electric discharge takes place substantially within a time period of less than one microsecond, and whereby the quantity of electrical energy transferred to the laser medium is increased relative to that absorbed by said plurality of inductive elements.

11. The apparatus as described in claim 10, wherein a gas impermeable enclosure is provided, said enclosure surrounding said first electrode and said second electrode and having means for filling said enclosure with said gaseous medium and for evacuating the gaseous medium therefrom.

* * * * *